Patented July 10, 1923.

1,461,359

UNITED STATES PATENT OFFICE.

ANTON LEDERER, OF VIENNA, AUSTRIA, ASSIGNOR TO WESTINGHOUSE LAMP COMPANY, A CORPORATION OF PENNSYLVANIA.

ELECTRIC GAS LAMP.

No Drawing. Application filed May 16, 1914. Serial No. 839,091.

*To all whom it may concern:*

Be it known that I, ANTON LEDERER, a subject of the Emperor of Austria, and a resident of Vienna, Austria, have invented certain new and useful Improvements in Electric Gas Lamps, of which the following is a specification.

This invention relates to electric gas lamps, that is to say electric lamps in which a gas or mixture of gases, particularly the so called rare gases such as neon, helium, argon, krypton, etc., forms the light giving medium. One lamp of this character has electrodes of an alkali metal, potassium for example.

Experience has shown that the longer such lamps have been used the easier will they light up. The inventor believes that this phenomen is due to the fact that in consequence of the evaporation of the material of which the electrodes of the lamp are made a deposit is formed on the inside of the lamp tube which facilitates the lighting of the lamp. New lamps should therefore, so to say, be "seasoned" in order that they may be easily lighted. As the result a considerable part of the life of the lamp is lost or this disadvantage of not lighting up easily for a certain period must be taken into account when the lamp is sold.

According to the present invention, in order to avoid this drawback and shorten or entirely do away with the period of seasoning", the lamp is artificially provided either on a portion or on the whole of the interior of the lighting tube or on a surface located in the interior thereof, with a thin metallic deposit which will only very slightly impair the radiation of light. The lamp will then light up very readily and will be far more reliable in operation. Potassium, sodium, cæsium, rubidium, lithium and antimony are examples of the metals of which the thin deposit may advantageously consist.

This deposit may be produced in a simple way by causing the metallic electrode material to partly evaporate or disintegrate prior to or at the first operation of the lamp. This may be done by "over-running" the lamp that is by passing through the lamp a current greater than that for which it is normally designated to operate. For instance in the case of a lamp destined for ordinary alternate current voltage of 220 volt, the deposit is produced by the high tension current of an induction coil. The metal may be contained directly in the electrode vessels and may be evaporated by "over-running" or by heating it externally by a suitable source of heat such as a Bunsen flame, so as to evaporate beyond the electrode vessels, forming a deposit in the vicinity of the electrodes. The time of "over-running" is a very short one, only seconds to minutes, and is to be considered as sufficient when a deposit has been formed at the electrode vessels.

The lamp may be subjected to "over-running" before being completed, while there is still a possibility of regulating the gas-filling, or after being completed.

In this way a lamp is produced which as soon as it is connected to an electric circuit can be put into operation without any difficulty.

I claim as my invention:

1. The method of lowering the starting potential of a commercially unfinished electric discharge device, which comprises vaporizing and forming in the device a thin deposit of an electro-conductive material, as a step preliminary to its commercial use.

2. The method of lowering the potential drop of a commercially unfinished electric discharge device containing a monatomic gas surrounding solid electrodes, which comprises vaporizing an electro-conductive material within said device, as a step preliminary to its commercial use.

3. The method of lowering the starting potential of a commercially unfinished gas lamp, which comprises forming in the lamp by rapid distillation a thin deposit of an electro-conductive material, as a step preliminary to its commercial use.

4. The method of lowering the starting potential of a commercially unfinished gas lamp, which comprises forming in the lamp by rapid distillation a thin deposit of electrode material, as a step preliminary to its commercial use.

5. The method of lowering the starting potential of a commercially unfinished gas lamp, which comprises depositing in the lamp by rapid distillation a small quantity of an alkali metal, as a step preliminary to its commercial use.

6. The method of lowering the starting potential of a commercially unfinished gas lamp, which comprises introducing within the lamp a small quantity of an alkali metal in the form of a deposit located in the vicinity of the electrodes, as a step preliminary to its commercial use.

7. The method of reducing the period required for seasoning a gas lamp until the starting potential thereof is lowered substantially to its minimum value, which comprises rapidly vaporizing a small quantity of electro-conductive material within the lamp, as a step preliminary to its commercial use.

8. As an article of manufacture, an electric gas or vapor lamp comprising an envelope, electrodes therein, at least one of said electrodes consisting of an alkali metal, and a thin, solid, metallic deposit in the interior of said envelope, said deposit being formed prior to the commercial use of the lamp, whereby the minimum starting potential thereof is initially present.

9. As an article of manufacture, an electric gas or vapor lamp comprising an envelope, electrodes therein, at least one of said electrodes consisting of an alkali metal, and a deposit of distilled electrode material in the interior of said envelope, said deposit being formed prior to the commercial use of the lamp, whereby the minimum starting potential thereof is initially present.

10. As an article of manufacture, an electric gas or vapor lamp comprising an envelope, electrodes therein, at least one of said electrodes consisting of an alkali metal, and a deposit of distilled alkali metal in the interior of said envelope, said deposit being formed prior to the commercial use of the lamp, whereby the minimum starting potential thereof is initially present.

11. As an article of manufacture, an electric gas or vapor lamp comprising an envelope, electrodes therein, at least one of said electrodes consisting of an alkali metal, and a distilled thin, metallic deposit in the interior of said lamp, said deposit being formed prior to the commercial use of the lamp, whereby the minimum starting potential thereof is initially present.

12. An electric gas lamp comprising an envelope containing a rare gas, electrodes of an alkali metal within said envelope, and a distilled deposit of said alkali metal within said envelope, said deposit being formed prior to the commercial use of the lamp, whereby the minimum starting potential thereof is initially present.

13. An electric gas lamp comprising an envelope containing neon, electrodes therein, at least one of said electrodes consisting of an alkali metal, and a deposit of said alkali metal in the interior of said envelope, said deposit being formed prior to the commercial use of the lamp, whereby the minimum starting potential thereof is initially present.

14. An electric gas lamp comprising an envelope containing neon, alkali metal electrodes within said envelope, and a distilled deposit of the electrode material in said envelope, said deposit being formed prior to the commercial use of the lamp, whereby the minimum starting potential thereof is initially present.

In testimony whereof I have hereunto subscribed my name this fifth day of May 1914.

ANTON LEDERER.

Witnesses:
A. H. HOPPER,
W. B. GREER.